H. S. SINES.
RECORDER FOR SYSTEMS OF ELECTRICAL DISTRIBUTION.
APPLICATION FILED DEC. 31, 1915.
1,213,963.
Patented Jan. 30, 1917.
4 SHEETS—SHEET 2.
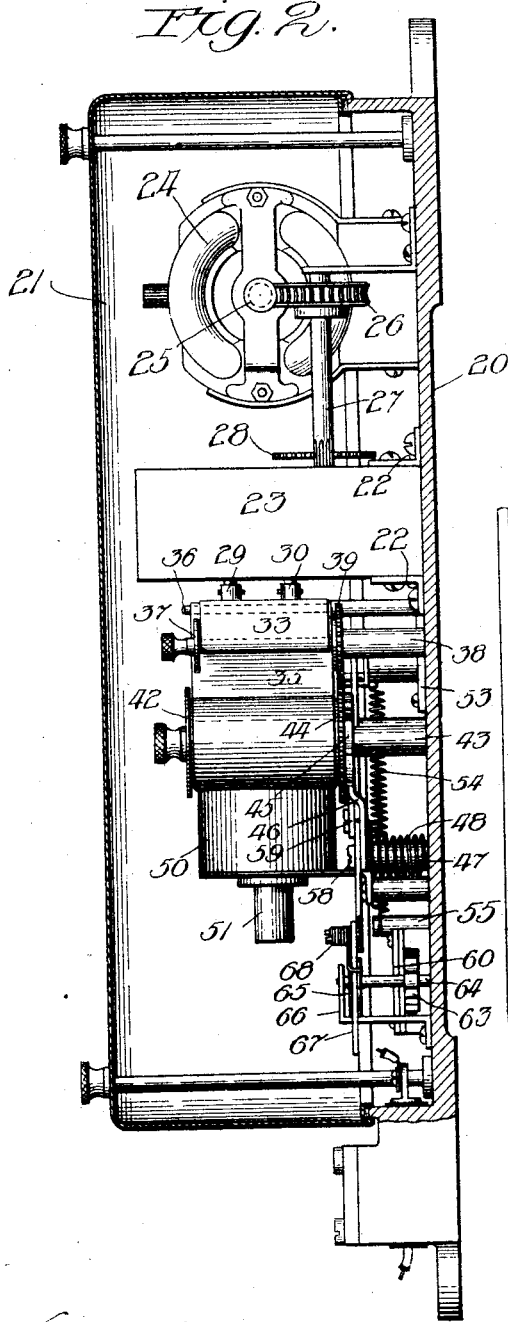
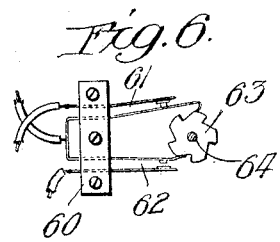
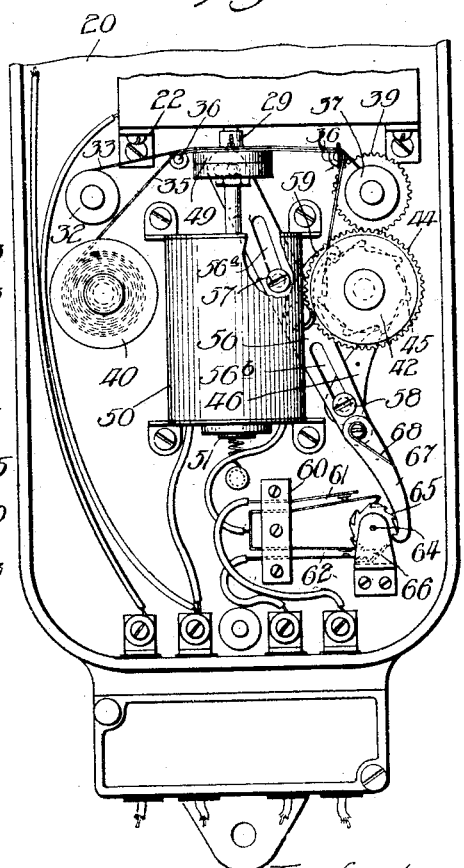
Witnesses:
Harry S. Gaither
Alvin C. Ahlberg
Inventor:
Harold S. Sines
by Williams & Bradbury
Attys H. S. SINES.
RECORDER FOR SYSTEMS OF ELECTRICAL DISTRIBUTION.
APPLICATION FILED DEC. 31, 1915.
1,213,963.
Patented Jan. 30, 1917.
4 SHEETS—SHEET 3.
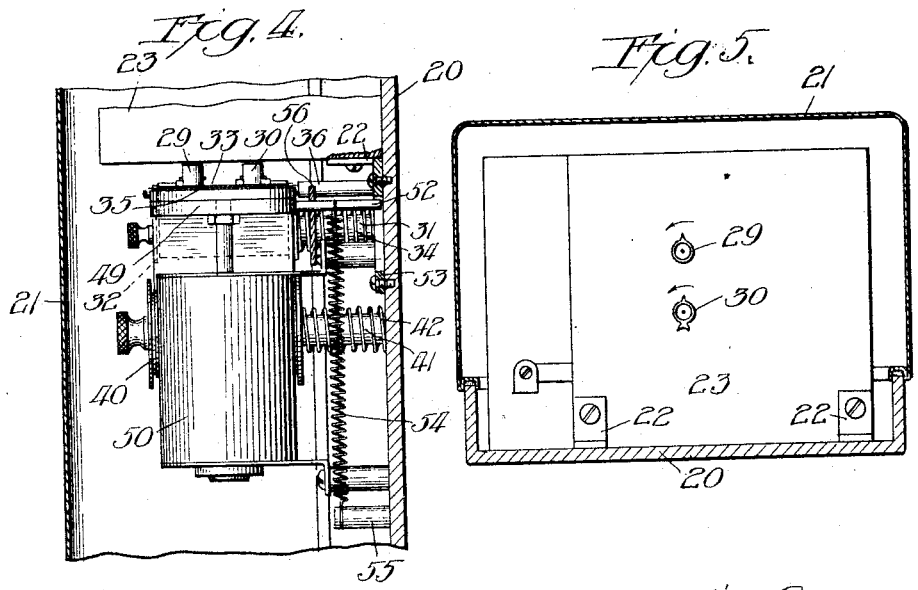
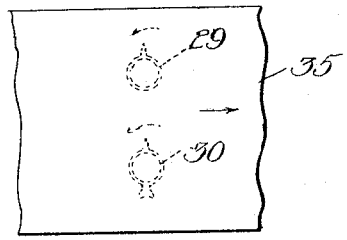
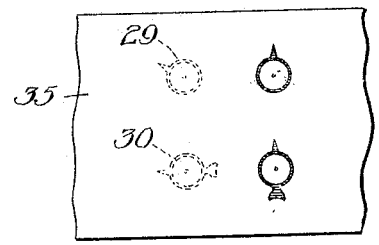
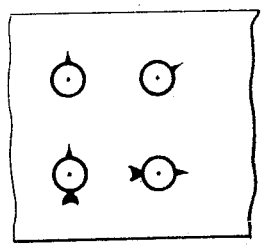
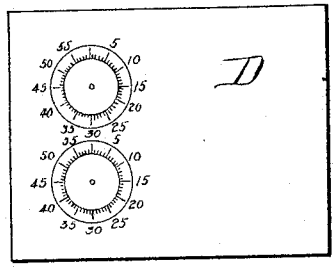
Witnesses:
Inventor:
Harold S. Sines
by Williams & Bradbury
Attys

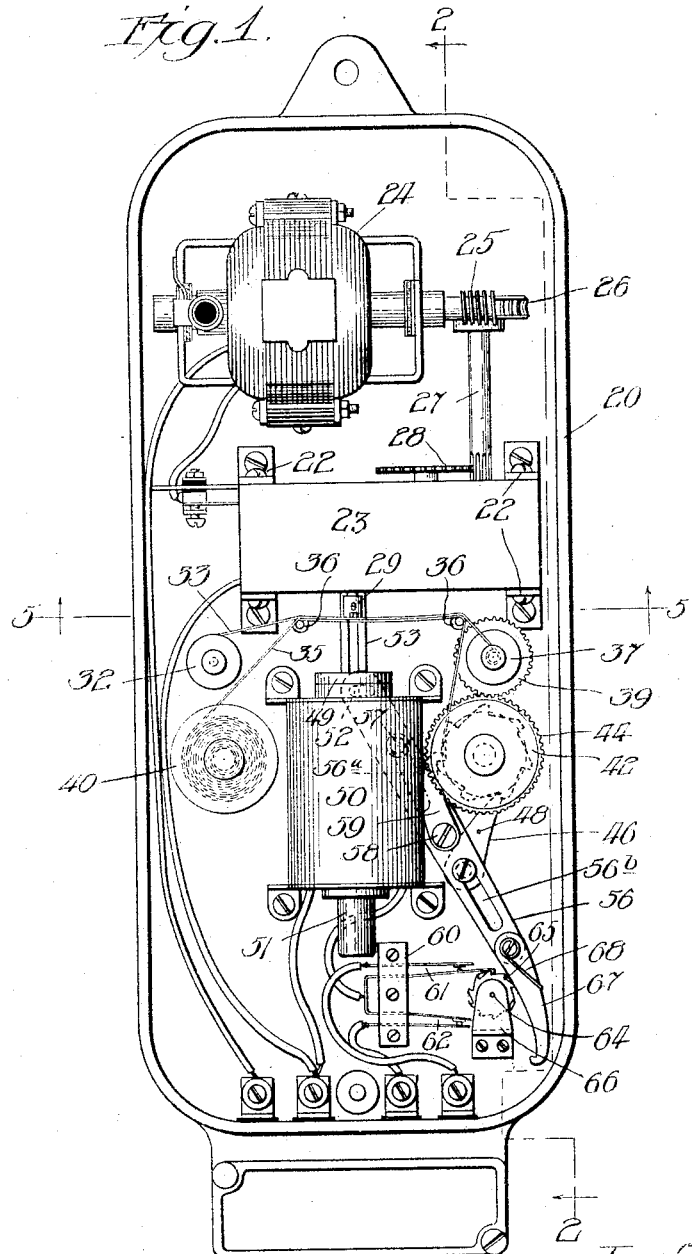

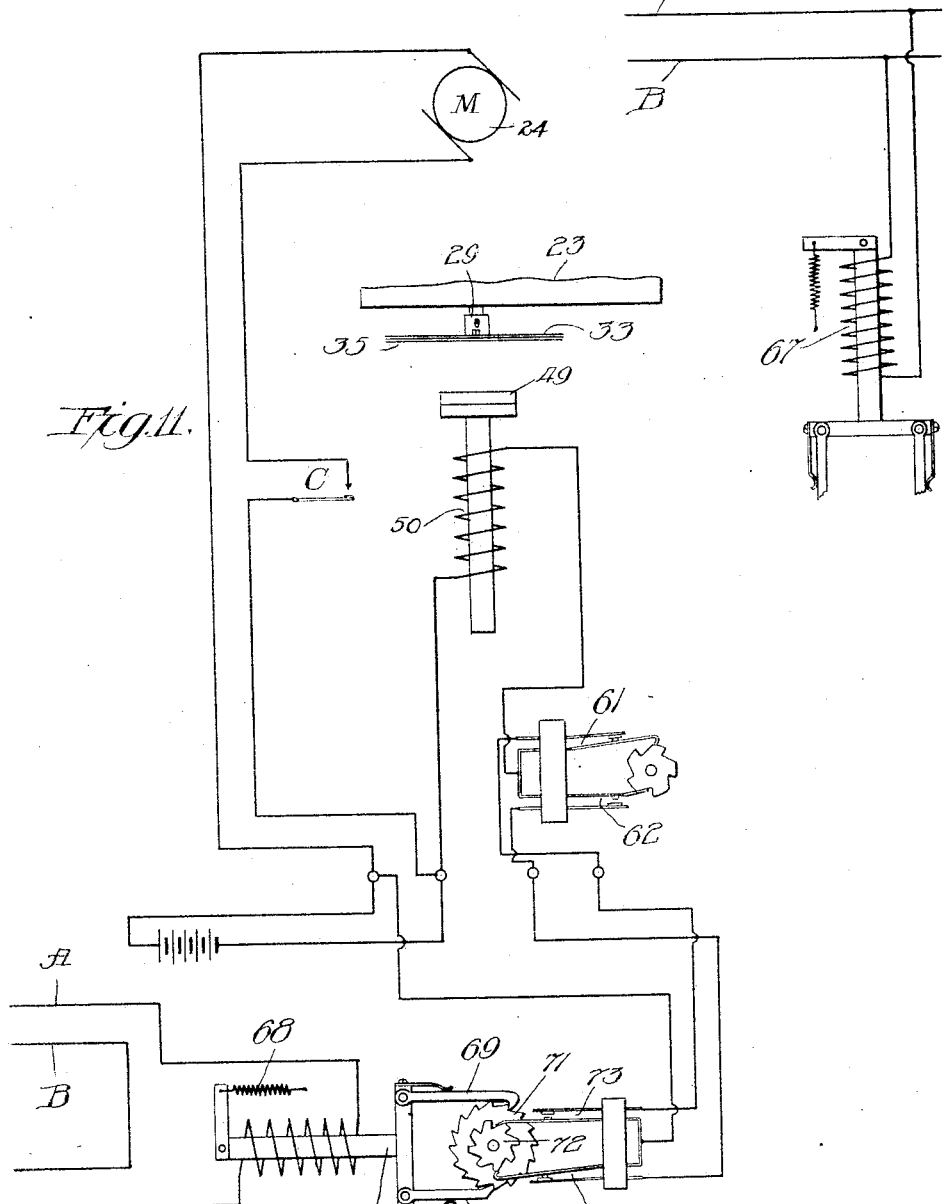

UNITED STATES PATENT OFFICE.

HAROLD S. SINES, OF CHICAGO, ILLINOIS, ASSIGNOR TO MINERALLAC ELECTRIC COMPANY, OF CHICAGO, ILLINOIS, A CORPORATION OF ILLINOIS.

RECORDER FOR SYSTEMS OF ELECTRICAL DISTRIBUTION.

1,213,963. Specification of Letters Patent. Patented Jan. 30, 1917.

Application filed December 31, 1915. Serial No. 69,598.

*To all whom it may concern:*

Be it known that I, HAROLD S. SINES, a citizen of the United States, residing at Chicago, in the county of Cook and State of Illinois, have invented a certain new and useful Improvement in Recorders for Systems of Electrical Distribution, of which the following is a full, clear, concise, and exact description, reference being had to the accompanying drawings, forming a part of this specification.

My invention relates to an improved recorder for use in association with systems of electrical distribution, and more specifically my invention contemplates the provision of means associated with and either directly or indirectly controlled from an electric circuit adapted each time a certain extraordinary condition exists in the circuit to make a record thereof as well as to record the duration of the time interval during which said extraordinary condition exists.

Central station companies have in the past experienced considerable difficulty with certain classes of consumers the particular requirements of whose business requires that their supply of electrical energy be continuous and at a constant rate at all times, or during certain periods of the day. For instance I will cite the cases of consumers who utilize the electrical energy furnished them to operate ice making machinery, coffee roasting machinery, etc. In such cases it is necessary that the consumer's supply of electrical energy be available at all times during which any run of ice is undergoing the process of artificial freezing, or a quantity of coffee is undergoing the roasting operation. In such cases if the supply of energy be cut off due to some fault on the part of the central station company, or otherwise, the particular material undergoing treatment is liable to be seriously damaged or ruined, and the consumer who has suffered damage due to the cessation of his supply of electrical energy often looks to the central station company to make compensation for the damage sustained by the consumer due to the cutting off of his electrical energy supply as aforesaid.

This invention, as will more fully hereinafter appear, provides means whereby the central station company may have available records of all so-called "outages" and thus be able to determine the justice of claims made by consumers for damages sustained by reason of cessation in their electrical energy supply.

The particular embodiment of my invention hereinafter described in detail provides in combination with chronometer mechanism means coöperating with the chronometer mechanism adapted to record upon a suitable record sheet the times when the normal electricity supply to a given circuit is cut off as well as the duration of the time interval during which the energy supply is thus cut off.

In the accompanying drawings illustrating my invention, Figure 1 is a front elevational view of the recording mechanism and parts associated therewith; Fig. 2 is a view partly in section and partly in elevation taken on the line 2—2 of Fig. 1 and looking in the direction indicated by the arrow; Fig. 3 is a fragmentary elevational view similar to Fig. 1, but showing certain of the operating parts in changed position; Fig. 4 is a fragmentary view partly in section and partly in elevation illustrating certain structural details not fully shown in the preceding figures; Fig. 5 is a transverse sectional view taken on the line 5—5 of Fig. 1 and looking in the direction indicated by the arrows, this view showing in particular the printing hands operated by the chronometer mechanism; Fig. 6 is an isolated detail view of the contact mechanism associated with the recording mechanism of Figs. 1 to 5 inclusive; Fig. 7 diagrammatically illustrates the relative positions assumed by the chronometer printing hands and the record sheet; Fig. 8 is a view similar to Fig. 7, but showing the record sheet as having had one reading impressed thereon and the several parts in condition for taking another reading; Fig. 9 is a view of the record sheet after it has been removed from the recording mechanism; Fig. 10 is a view of a transparent sheet provided with marking corresponding to the dial of a clock which may be placed over the impressions made upon the record sheet in order to ascertain just what time interval elapsed between successive records upon the record sheet. Fig. 11 is a diagrammatic representation of the several circuit connections which may be employed, this view also illustrating diagrammatically the means through which the circuit with which the recording mechanism is associated determines and controls the operation of the recording mechanism; and Fig. 12 illustrates a somewhat modified circuit arrangement.

Similar characters of reference refer to similar parts throughout the several views.

Referring first to Figs. 1 to 5, inclusive, the recording mechanism embodying my invention is mounted upon a suitable base illustrated at 20, this base being conveniently arranged to be secured upon a wall or other support and provided with a marginal flange arranged to coöperate with a glass cover 21 in order to protect the operating parts supported by the base. The cover 21 is retained in position by any suitable well-known means which need not be described in detail. Mounted in suitable brackets 22—22 carried by the base 20 is a chronometer housing 23. In so far as the present invention is concerned the detailed construction of the clock mechanism is not material, but I will say that the chronometer mechanism is conveniently of the self-winding type. At 24 I have illustrated a small sized electric motor the shaft of which is provided with a worm 24 coöperating with a worm gear 26 fixed upon the upper end of a vertical shaft 27 the lower end of which is provided with teeth coöperating with a spur gear 28 mounted upon a shaft extending into the chronometer housing 23. It will suffice to say that whenever the driving spring of the chronometer mechanism has run down sufficiently to make rewinding necessary the circuit of the motor 24 is closed in any suitable manner, whereupon the motor operates through the connections just described to effect the rewinding operation, the circuit for the motor being opened after the rewinding has been completed. These features of clock construction are old and for the purpose of clearness I have omitted a detailed showing of the chronometer mechanism.

Referring more particularly to Fig. 5, it will be seen that the chronometer mechanism drives two shafts upon which are mounted printing hands 29 and 30. The printing hands 29 and 30 correspond to the second and minute hands of a clock, but are operated in contra-clockwise direction. I wish it to be understood at this point that while I have illustrated but two printing hands, that is, a second hand and a minute hand, I contemplate providing an hour hand if such a hand is desirable in order to meet the requirements of any particular case. The printing hand 29 which makes one complete revolution per minute comprises an annular printing surface and an arrow point and is conveniently provided with a central printing point in order that the axis of the printing hand may readily be ascertained in reading the record sheet, as will more fully hereinafter appear. The printing hand 30 which makes one revolution per hour corresponds to the printing hand 29 except that it is conveniently provided with some means to distinguish it from the hand 29 which, in the present instance, is an arrow shaft located diametrically opposite the arrow point. As is perhaps most clearly illustrated in Fig. 4 the base 20 supports a post 31 upon which is mounted a spool 32 having a suitably inked tape 33 wound thereon. The spool 32, which is the supply spool, is normally frictionally held against movement by the helical spring 34 disposed around the supporting post 31. From the supply spool 32 the inked tape 33 passes, together with a suitable record sheet or tape 35, over pins 36—36 past the printing hands 29 and 30. The inked tape is wound upon a spool 37 mounted for operation upon a post 38 carried by the base 20. Fixed with respect to the spool 37 is a spur gear 39 the function of which will presently be made apparent. The record sheet 36 is carried by a supply spool or roller 40 mounted upon a post 41 carried by the base 20, the record sheet supply roller 40 being normally frictionally held against movement by the helical spring 42 disposed around the post 41. From the supply spool 40 the record sheet 35 passes around the pins 36—36, as has been previously described, and over the driven spool 42 mounted for operation upon a post 43 carried by the base 20, as is most clearly illustrated in Fig. 2. The driven spool 42 carries a spur gear 44 meshing with the spur gear 39 of the inked tape receiving spool 37. By virtue of the geared connection between the spools 37 and 42 the inked tape is advanced when the record sheet is advanced. In addition to the spur gear 44 the spool 42 has fixed thereto a ratchet wheel 45 with which coöperates a retaining pawl 46 mounted upon a post 47 carried by the base, as is most clearly illustrated in Fig. 2. A helical spring 48 disposed around the post 47 and having one end thereof connected with the post and the other connected with the retaining pawl 46 normally tends to hold the retaining pawl in engagement with the teeth of the ratchet 45. The means for effecting the step by step advancement of the ratchet 45, and thus the receiving spools for the record sheet and inked tape, will be described in connection with the mechanism which serves to effect the printing operation.

At 49 I have illustrated a platen disposed beneath the printing hands 29 and 30 and arranged when operated to move the record sheet and inked tape toward and into engagement with the printing surfaces of the hands 29 and 30 and thus impress upon the sheet 35 a record of the positions of the printing hands 29 and 30. This platen 49 is preferably operated by electro-magnetic mechanism which in the present embodiment of my invention is a solenoid 50 having the plunger 51 upon which the platen 49 is mounted. Extending at right angles from the upper end of the solenoid plunger 51 is a pin 52 the free end of which engages in a longitudinal slot formed in a plate 53 carried by the base 20, as is most clearly illustrated in Fig. 4. A helical spring 54 acting between the pin 52 and the post 55 carried by the base normally retains the solenoid plunger and platen in retracted position. The pin 52 previously referred to extends through an elongated slot formed in the end of a sliding bar 56, as is, perhaps, most clearly illustrated in Figs. 1, 3, and 4. This bar 56 is provided with elongated slots 56$^a$ and 56$^b$ most clearly illustrated in Figs. 1 and 3. A screw 57 extends through the slot 56$^a$ in the bar 56, the said screw 57 engaging in the end of a post carried by the base 20. A similar screw 58 extends through the slot 56$^b$ of the bar 56, the screw 58 engaging a suitable post carried by the base 20 and which post in this instance happens to be the post 47 which supports the retaining pawl 46. Pivoted to the sliding bar 56 is a pawl 59 which has associated therewith a suitable spring normally tending to move the pawl into engagement with the teeth of the ratchet 45. From the construction just described it will be seen that when the platen 49 is advanced the bar 56 is also operated due to the pin and slot connection between the bar 56 and the solenoid plunger. When the bar 56 is thus operated the retaining pawl 46 maintains the ratchet 45 in position, the operating pawl 59 slipping over the next tooth of the ratchet and being thus in position to advance the ratchet wheel and parts connected therewith one step when the solenoid plunger is returned to normal position under the action of its spring 54.

Fixed upon the base 20 is an insulating block 60 which carries two pairs of contact springs illustrated at 61 and 62, one contact spring of each pair riding upon the periphery of a ratchet wheel 63, which ratchet wheel is fixed upon a shaft 64 suitably mounted in bearings provided by the base 20. Also fixed upon the shaft 64 is a ratchet wheel 65 provided with a suitable retaining spring 66, as illustrated most clearly in Fig. 3. The ratchet 65 is arranged to be advanced one step for each actuation of the solenoid plunger by virtue of a pawl 67 pivoted to the lower end of the sliding bar 56, the said pawl 67 having associated therewith a spring 68 which retains the pawl in engagement with the teeth of the ratchet 65.

I will not at this point describe the several circuit connections and it will suffice to say that each time the circuit for the solenoid 50 is rendered effective it is closed through whichever pair of the contact springs 61 and 62 happen to be in engagement with each other. It will thus be seen that the circuit for the solenoid is opened immediately after the solenoid has operated due to the advancement of the ratchet controlling the position of the contact springs 61 and 62.

In Fig. 11 I have illustrated at A and B conductors through which electrical energy is supplied to a consumer by a central station company. It will be noted that included in series with the conductor A is an electro-magnetically operated device which I have diagrammatically illustrated as a plunger 67 which is moved against the action of a spring 68 when a current is flowing through the circuit comprising the conductors A and B. The plunger 67 carries a pair of pawls 69 and 70 riding upon the periphery of a ratchet wheel 71 which has fixed with respect thereto a ratchet 72 of insulating material which determines the position of two pairs of contact springs 73 and 74. It will be noted that the relation of the ratchet wheel 72 to the contacts 73 and 74 is such that for any position of the ratchet wheel one pair of the contact springs is opened and the other pair closed. In Fig. 11 I have applied the same reference characters as in the other figures to the several parts of the recording apparatus heretofore described and I believe it will be apparent that, assuming the parts to be in the positions illustrated in Fig. 11, if the flow of current through the circuit comprising the conductors A and B ceases and the plunger 67 be permitted to move to the right under the action of its associated spring 68 the engagement of the contact springs 73 will be effected and the contact springs 74 will be disengaged one from the other. When the engagement of the contact springs 73 is thus effected the circuit for the solenoid 50 is closed through contacts 73 and contacts 61. Immediately upon the operation of the solenoid the contact springs 61 are disengaged and the solenoid plunger returns to normal position after having effected the printing operation and advances the record sheet and associated parts in the manner previously described. If now current again flows through the circuit comprising the conductors A and B the plunger 67 is moved against the tension of its associated spring 68 and the ratchet controlling mechanism for the contact springs 73 and 74 operates to dis-engage the contact springs 73 and effect the engagement of the contacts 74 thus again closing the circuit for the solenoid 50, but this time through the contact spring 62 associated with the recording mechanism. Immediately upon operation of the solenoid 50 the contact springs 62 are opened and the circuit for the solenoid 50 is rendered inoperative until the ratchet 72 controlled by the current traversing the circuit comprising the conductors A and B is operated to again effect the engagement of the contact springs 73. I have illustrated at C in Fig. 11 a switch controlling the circuit for the rewinding motor and it will be understood that this switch is closed whenever it is necessary that the driving spring for the chronometer mechanism be rewound.

In Fig. 12 I have illustrated an arrangement similar to that of Fig. 11, the only difference between the two showings being that in Fig. 12 the winding which determines the position of the plunger 67 is connected across the conductors A and B rather than in series with one of said conductors, as is the case in Fig. 11. In other words, it will be seen that in Fig. 11 the winding which determines the position of the plunger 67 is a current coil whereas in the showing of Fig. 12 it is a potential coil.

Referring now to Fig. 7 it will be seen that the record sheet 35 is located in immediate proximity to the printing hands 29 and 30. In Fig. 8 the printing hands are shown as having been utilized to make one impression upon the record sheet 35 and as in position to make another record. Fig. 9 shows the record sheet after two impressions have been taken and the duration of the time interval which existed between the taking of the two records is to be ascertained. In determining the duration of the time interval during which the "outage" existed the transparent sheet D, shown in Fig. 10, is placed first over one set of records and then over the other to ascertain the exact positions of the arrows printed upon the record sheet. I will say that the reading of the records upon the sheet, as shown in Fig. 9, indicates that the "outage" interval was of fifteen minutes and ten seconds duration. It will be understood that "outages" of greater duration than one hour are not apt to occur without the knowledge of the central station company and that, therefore, in most cases it is not necessary to provide a recording device capable of recording "outages" of greater duration than one hour.

From the foregoing description it will be seen that I have provided means controlled by the current traversing a consumer's supply circuit adapted to record when "outages" in the consumer's current supply have occurred and also the length of the periods of time during which said "outages" existed. From the record thus made available the central station company is enabled to determine the justice of all claims made by consumers due to cessation, or alleged cessation, in their supply of electrical energy.

Having thus described my invention what I claim as new and desire to secure by Letters Patent of the United States is:

1. In a system of electrical distribution the combination with a circuit through which electrical energy is supplied, together with means controlled by the energy traversing said circuit, operating both when the electrical energy supply to said circuit is cut off and when the energy supply is reëstablished, to record cessations in the supply of electrical energy and the duration of such cessations.

2. In a system of electrical distribution, the combination with a circuit through which electrical energy is supplied, of a chronometer mechanism, printing hands operated by said chronometer mechanism, mechanism for carrying a record sheet in proximity to said printing hands, a platen arranged when operated to move the record sheet toward the hands to effect a record, electro-magnetic mechanism for actuating the platen, a circuit for said electro-magnetic mechanism, and switching means controlled by the electrical energy traversing said first mentioned circuit arranged to cause the operation of the electro-magnetic mechanism each time the supply of electrical energy to said first mentioned circuit ceases and when the supply of electrical energy to said circuit is reëstablished.

3. In a system of electrical distribution the combination with a circuit through which electrical energy is supplied, a chronometer mechanism, printing hands operated by the chronometer mechanism, mechanism for carrying a record sheet in proximity to said printing hands, a platen arranged when operated to move the record sheet toward the hands to effect a record, electro-magnetic mechanism for actuating the platen, switching mechanism controlling the operation of said electro-magnetic mechanism, and means controlled by the energy traversing the circuit aforesaid, arranged and adapted to cause the operation of the switching mechanism and thus the operation of the electro-magnetic mechanism and platen each time the supply of electrical energy to said circuit ceases and also each time the supply of electrical energy to said circuit is reëstablished.

4. In a system of the class described, the combination with a circuit through which electrical energy is supplied, a time-keeping mechanism and means controlled by the current traversing said circuit coöperating with the time-keeping mechanism to make a record of the times when the energy supply to said circuit is cut off and reëstablished, whereby the duration of the "outage" intervals may be ascertained.

5. In a system of electrical distribution, a circuit through which electrical energy is supplied, a time-keeping mechanism, printing hands operated thereby, means for carrying a record sheet in proximity to said printing hands, and mechanism controlled by the energy traversing said circuit arranged to cause a record of the position of the printing hands to be impressed upon the record sheet when the normal energy supply to said circuit is cut off and reëstablished, whereby the duration of the "outage" intervals may be ascertained.

6. In a system of electrical distribution the combination with a circuit through which electrical energy is supplied, of means controlled from said circuit arranged and adapted to record cessations in the supply of electrical energy and duration of such cessation.

In witness whereof, I hereunto subscribe my name this 27th day of December 1915.

H. S. SINES.

Witnesses:
R. B. MAC DONALD,
S. S. COLE.

Copies of this patent may be obtained for five cents each, by addressing the "Commissioner of Patents, Washington, D. C."